US010705665B2

(12) United States Patent
Xie et al.

(10) Patent No.: US 10,705,665 B2
(45) Date of Patent: Jul. 7, 2020

(54) METAL MESH, TOUCH DISPLAY DEVICE AND METHOD FOR REDUCING MOIRE PATTERN IN TOUCH DISPLAY DEVICE

(71) Applicants: HEFEI XINSHENG OPTOELECTRONICS TECHNOLOGY CO., LTD., Hefei, Anhui (CN); BOE TECHNOLOGY GROUP CO., LTD., Beijing (CN)

(72) Inventors: Xiaodong Xie, Beijing (CN); Lei Zhang, Beijing (CN); Jing Wang, Beijing (CN); Min He, Beijing (CN); Yu Zhu, Beijing (CN); Tengfei Zhong, Beijing (CN)

(73) Assignees: HEFEI XINSHENG OPTOELECTRONICS TECHNOLOGY CO., LTD., Hefei, Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/337,686

(22) PCT Filed: Jun. 22, 2018

(86) PCT No.: PCT/CN2018/092357
§ 371 (c)(1),
(2) Date: Mar. 28, 2019

(87) PCT Pub. No.: WO2019/041985
PCT Pub. Date: Mar. 7, 2019

(65) Prior Publication Data
US 2020/0033999 A1 Jan. 30, 2020

(30) Foreign Application Priority Data
Aug. 31, 2017 (CN) .......................... 2017 1 0774962

(51) Int. Cl.
*G06F 3/044* (2006.01)
*G06F 3/041* (2006.01)

(52) U.S. Cl.
CPC .......... *G06F 3/0447* (2019.05); *G06F 3/0412* (2013.01); *G06F 2203/04112* (2013.01)

(58) Field of Classification Search
CPC ................. G06F 3/0447; G06F 3/0412; G06F 2203/04112
See application file for complete search history.

(56) References Cited

U.S. PATENT DOCUMENTS

2015/0346866 A1\* 12/2015 Kusunoki ............... G06F 3/044
345/174

FOREIGN PATENT DOCUMENTS

| CN | 104808854 | 7/2015 |
| CN | 105528119 | 4/2016 |

(Continued)

OTHER PUBLICATIONS

Wang et al., CN 105528119 B machine translation, Apr. 27, 2016 (Year: 2016).\*

(Continued)

*Primary Examiner* — Peter D McLoone
(74) *Attorney, Agent, or Firm* — Myers Bigel, P.A.

(57) ABSTRACT

A metal mesh, a touch display device, and a method for reducing moire pattern in a touch display device are provided. The metal mesh includes at least two first metal lines which are arranged in parallel and separated from one another, and at least two second metal lines which are arranged in parallel and separated from one another and intersect the at least two first metal lines. The first metal lines and the second metal lines have a width of 1-6 µm, an the intersection angle between the first metal lines and the second metal lines is 66-70 degrees, and a distance between (Continued)

two neighboring first metal lines and a distance between two neighboring second metal lines are 160-170 µm or 200-210 µm.

13 Claims, 4 Drawing Sheets

(56) References Cited

FOREIGN PATENT DOCUMENTS

| | | |
|---|---|---|
| CN | 106990868 | 7/2017 |
| CN | 107515697 | 12/2017 |

OTHER PUBLICATIONS

Chen et al., CN 104808854 B machine translation, Jul. 29, 2015 (Year: 2015).*

International Search Report and Written Opinion of the International Searching Authority (with English language translation of Written Opinion), International Application No. PCT/CN2018/092357, dated Jun. 22, 2018, 13 pp.

First Office Action and English language translation, CN Application No. 201710774962.6, dated Mar. 11, 2019, 6 pp.

* cited by examiner

METAL MESH, TOUCH DISPLAY DEVICE AND METHOD FOR REDUCING MOIRE PATTERN IN TOUCH DISPLAY DEVICE

CROSS REFERENCE TO RELATED APPLICATIONS

The present application is a 35 U.S.C. 371 national stage application of PCT International Application No. PCT/CN2018/092357, filed on Jun. 22, 2018, which claims the benefit of Chinese Patent Application No. 201710774962.6, filed on Aug. 31, 2017, the contents of which are incorporated by reference in their entireties. The above-referenced International Application was published in the Chinese language as International Publication No. WO 2019/041985 A1 on Mar. 7, 2019.

TECHNICAL FIELD

The present disclosure relates to the field of display technologies, and particularly to a metal mesh, a touch display device and a method for improving moire pattern in a touch display device.

BACKGROUND

With the advent of electronic products, and especially the capacitive touch display devices with excellent touch function from Apple, these electronic products have become more popular. Various touch display devices have been put into the market to keep up with Apple. In one of the most popular touch display device, a metal mesh is adopted, and the touch display device features high touch accuracy and sensitivity. With the advent of Win10 from Microsoft, active pen schemes with amazing functions appear in the market. This kind of two-in-one notebook computer is required to cooperate with a metal mesh touch display device. The combined product shows outstanding operational properties, and become popular in the market. Due to the introduction of the active pen scheme, the requirements against the touch display device become higher, and the touch display device shall have both excellent electrical properties and excellent optical properties. However, in the metal mesh touch display device, the regular grid brings about optical problems, among which the moire pattern problem becomes a trouble.

Thus, there is need to improve the current touch display device.

SUMMARY

In an aspect of the present disclosure, it is provided a metal mesh. In embodiments of the present disclosure, the metal mesh comprises: at least two first metal lines which are arranged in parallel and separated from one another; at least two second metal lines which are arranged in parallel and separated from one another, and intersect the at least two first metal lines; wherein the first metal lines and the second metal lines have a width of 1-6 µm, an the intersection angle between the first metal lines and the second metal lines is 66-70 degrees, and a distance between two neighboring first metal lines and a distance between two neighboring second metal lines are 160-170 µm or 200-210 µm.

In embodiments of the present disclosure, the first metal lines and the second metal lines have a width of 1-2 µm.

In embodiments of the present disclosure, the first metal lines have a same width as the second metal lines.

In embodiments of the present disclosure, the at least two first metal lines and the at least two second metal lines intersect to form at least one rhombus.

In embodiments of the present disclosure, the rhombus has an acute angle of 66, 67, 68, 69 or 70 degrees, and the rhombus has a height of 160, 170, 200 or 210 µm.

In another aspect of the present disclosure, it is provided a touch display device. In embodiments of the present disclosure, the touch display device comprises a touch module, the touch module comprises touch electrodes which comprise the above-described metal mesh.

In embodiments of the present disclosure, touch electrodes of the touch module comprise a drive electrode and a sense electrode which are stacked and insulated from each other, and the drive electrode and the sense electrode have a stripe shape and intersect with each other.

In embodiments of the present disclosure, the drive electrode is made from a first metal mesh, the sense electrode is made from a second metal mesh, the first metal mesh comprises at least one first rhombus, and the second metal mesh comprises at least one second rhombus.

In embodiments of the present disclosure, the first rhombus and the second rhombus have a same shape and size, and an orthographic projection of vertexes of the first rhombus on the second metal mesh overlaps a center of symmetry of the second rhombus.

In embodiments of the present disclosure, the touch display device further comprises a display module, wherein the display module comprises an array substrate, a color filter substrate and a polarizer, the display module and the touch module are stacked with each other, and the display module has a pixel density of 250-300 pixels per inch.

In embodiments of the present disclosure, the touch module is arranged between the color filter substrate and the polarizer of the display module.

In embodiments of the present disclosure, the touch module is arranged between the array substrate and the color filter substrate of the display module.

In embodiments of the present disclosure, the touch module is arranged on a cover plate of the touch display device.

In another aspect of the present disclosure, it is provided a method for improving moire pattern in a touch display device. In embodiments of the present disclosure, the method comprises: forming a touch electrode of the touch display device by using the above-described metal mesh.

In embodiments of the present disclosure, the touch display device further comprises a display module, and the method further comprises: arranging the display module with a pixel density of 250-300 pixels per inch.

DETAILED DESCRIPTION OF EMBODIMENTS

Embodiments of the present disclosure will be described in detail hereafter. The following embodiments are exemplary in nature for explaining the present disclosure, but are not construed as limitations to the present disclosure. As for techniques or conditions which are not described in detail in embodiments, reference can be made to the techniques or conditions as described by publications in the art or the instructions of a product. All the reagents or instruments which are not identified with manufactures are conventional products which are commercially available.

Currently, a touch display device generally consists of a touch detect portion and a touch controller. The touch detect portion is mounted in front of a display screen for detecting the position of touching, forwards the detected information to the controller, transforms the information into coordinates, and conveys them to a central processor. At the same time, the touch detect portion receives signals from the central processor, and carries out a task to realize man-machine interaction. However, since the touch electrodes are formed above the display screen in the touch display device, in case light exits from the display screen and passes through the touch display device, the electrode pattern on the display screen will affect the light. Light is generated by basic units which are surrounded by a regularly arranged black matrix (BM). When light passes through the electrode pattern and encounters the regular metal mesh sensors, two sinusoidal waves which have a constant amplitude and two similar frequencies are developed. The amplitude of the composite signal varies according to the difference between these two frequencies, and forms a beat frequency in space, which results in a moire pattern. In order to solve the above problem, the inventors have conducted extensive research and proposed to alleviate the problem of moire pattern by structural design of the metal mesh, so as to improve optical properties and operational performance of the touch display device.

Figure 1:
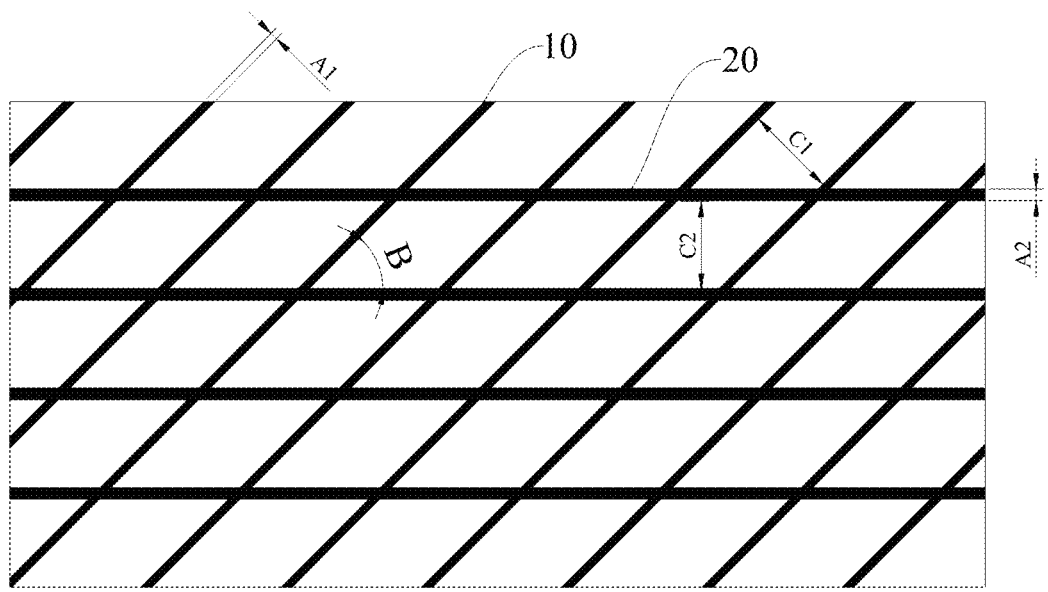
FIG. 1 is a schematic view for illustrating a grid for improving moire pattern in an embodiment of the present disclosure.

In view of this, in an aspect of the present disclosure, it is provided a metal mesh. In embodiments of the present disclosure, as shown in FIG. 1, the metal mesh comprises: at least two first metal lines 10 which are arranged in parallel and separated from one another; at least two second metal lines 20 which are arranged in parallel and separated from one another. The at least two second metal lines 20 intersect the at least two first metal lines 10. In order to effectively alleviate the moire pattern and obtain a touch display device with improved display effect, the inventors have modified parameters like a width A1 of the first metal lines, a width A2 of the second metal lines, an intersection angle B between the first metal lines and the second metal lines, a distance C1 between two neighboring first metal lines, a distance C2 between two neighboring second metal lines C2, and has obtained an optimized design which effectively alleviates the moire pattern in a touch display device comprising a metal mesh. In particular, the width A1 of the first metal lines 10 and the width A2 of the second metal lines 20 are 1-6 μm, the intersection angle B between the first metal lines 10 and the second metal lines 20 is 66-70 degrees, and the distance C1 between two neighboring first metal lines 10 and the distance C2 between two neighboring second metal lines 20 are 160-170 μm or 200-210 μm. Thereby, the design is simple, convenient and easy to realize. A material for forming the metal mesh is cheap, and there is no need for the expensive ITO, so that the cost is low. The structural design of the metal mesh with the above size can be effectively improved optical difference. By adopting the above metal mesh, the touch display device has an alleviated moire pattern, improved optical properties, and excellent operational performance.

In embodiments of the present disclosure, there is no specific limitation to a metal for forming the first metal lines 10 and the second metal lines 20, a person with ordinary skill in the art can select the metal flexibly as needed. For example, the metal comprises, but not limited to, silver, copper. Thereby, the expensive ITO can be replaced, and the cost is reduced.

In embodiments of the present disclosure, the width A1 of the first metal lines 10 and the width A2 of the second metal lines 20 are 1-2 μm. In case the width is relatively large, the moire pattern is very serious, and the display effect is poor. In case the width is relatively small, the first and second metal lines are difficult to fabricate and the yield is low, which is not favorable for industrial production. In case the width A1 of the first metal lines 10 and the width A2 of the second metal lines 20 are arranged in the above range, the first and second metal lines are not only easy to realize, but also can significantly alleviate the moire pattern. At the same time, the light transmitting properties is improved, so that the display effect of the touch display device can be significantly improved.

In embodiments of the present disclosure, there is no specific limitation to difference between the width A1 of the first metal lines 10 and the width A2 of the second metal lines 20, and can be selected flexibly as needed by the person with ordinary skill in the art. According to some embodiments of the present disclosure, the width A1 of the first metal lines 10 is equal to the width A2 of the second metal lines 20. This design is easy to fabricate, and the fabricating steps are simple, so that the moire pattern in the touch display device can be effectively alleviated. This effectively improves optical properties of the touch display device, and improves the operational performance of the display device.

Figure 2:
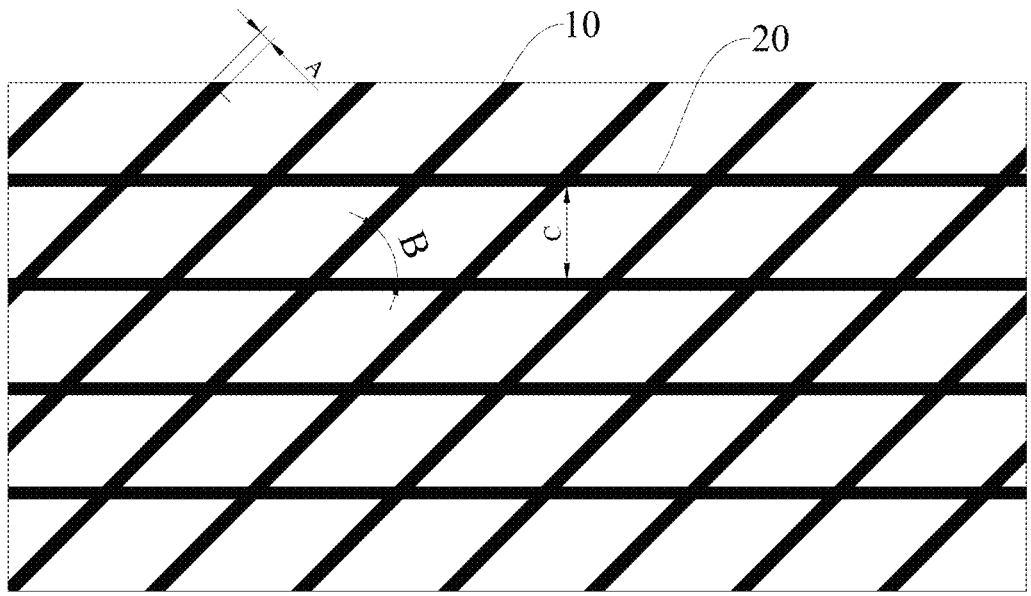
FIG. 2 is a schematic view for illustrating a grid for improving moire pattern in an embodiment of the present disclosure.

In embodiments of the present disclosure, in order to further alleviate moire pattern, and simplify the fabricating steps, as shown in FIG. 2, the at least two first metal lines 10 and the at least two second metal lines 20 intersect to form at least one rhombus. This can improve the moire pattern problem in the touch display device to which the metal mesh is applied. As a result, the display uniformity is improved, the display image will not show significant difference at different positions due to the different moire pattern effect, and the moire phenomenon is reduced. This effectively improves optical properties of the touch display device, and improves the operational performance of the display device.

In embodiments of the present disclosure, as shown in FIG. 2, two neighboring sides of the rhombus form an acute angle B of 66-70 degrees, and the degree for the acute angle B is an integer. The rhombus has a height C of 160-170 μm or 200-210 μm, and the value for the height C is an integer. In embodiments of the present disclosure, in case the acute angle B is 66-70 degrees, the height C is 160-170 μm, and in case the acute angle B is 66-69 degrees, the height C is 200-210 μm. In other words, in case the height C is 160-170 μm, the acute angle B is 66-70 degrees, and in case the height C is 200-210 μm, the acute angle B is 66-69 degrees. The metal lines comprised by the rhombus have an equal width A of 1-6 μm, and the value for the width A is an integer. In the above range, the touch display device to which the metal mesh is applied has a moire pattern grade not higher than Grade 2, and has satisfactory optical properties and display effect. In the context of the present disclosure, the height C of the rhombus indicates a distance between opposite sides of the rhombus.

According to some specific embodiments of the present disclosure, the at least two first metal lines 10 and the at least two second metal lines 20 intersect to form at least one rhombus. The metal lines comprised by the rhombus have the width A=4±1 μm. In a specific example, the acute angle B of the rhombus is 66 degrees, and the height C of the rhombus is 170 μm. In another specific example, the acute angle B of the rhombus is 66 degrees, and the height C of the rhombus is 210 μm. In another specific example, the acute angle B of the rhombus is 67 degrees, and the height C of the rhombus is 160 μm. In another specific example, the acute angle B of the rhombus is 67 degrees, and the height C of the rhombus is 170 μm. In another specific example, the acute angle B of the rhombus is 67 degrees, and the height C of the rhombus is 210 μm. In another specific example, the acute angle B of the rhombus is 68 degrees, and the height C of the rhombus is 160 μm. In another specific example, the acute angle B of the rhombus is 68 degrees, and the height C of the rhombus is 170 μm. In another specific example, the acute angle B of the rhombus is 69 degrees, and the height C of the rhombus is 160 μm. In another specific example, the acute angle B of the rhombus is 69 degrees, and the height C of the rhombus is 170 μm. In another specific example, the acute angle B of the rhombus is 70 degrees, and the height C of the rhombus is 160 μm. In another specific example, the acute angle B of the rhombus is 70 degrees, and the height C of the rhombus is 170 μm. In another specific example, the acute angle B of the rhombus is 70 degrees, and the height C of the rhombus is 200 μm. The metal mesh which satisfies the above design conditions can effectively reduce the possibility the moire pattern appears in the touch display device to which the metal mesh is applied, and the moire pattern grade is not higher than Grade 2, so that the optical properties and operational properties of the touch display device are ensured.

In another aspect of the present disclosure, the present disclosure proposes a touch display device. In embodiments of the present disclosure, the touch display device comprises a touch module, and the touch module comprises touch electrodes which comprise the above-described metal mesh. Thereby, the structure is simple and easy to realize, the expensive ITO is not needed, and the cost is low. By adopting the above-described metal mesh, it is possible to effectively alleviate the moire pattern problem of the touch display device, and improve the optical properties of the touch display device.

Figure 3A:
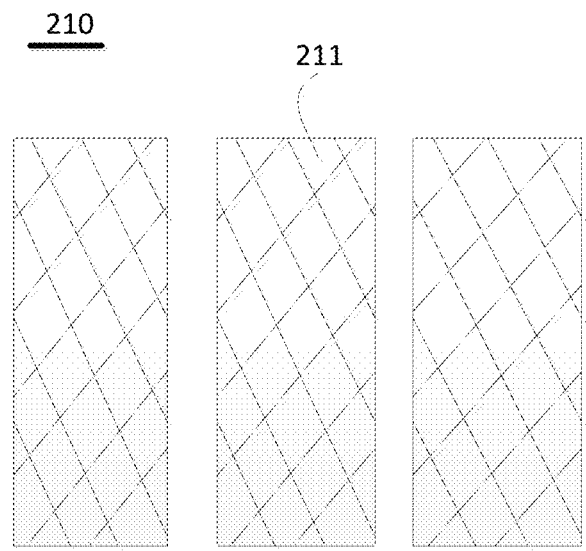
FIG. 3a is a schematic view for illustrating a drive electrode in an embodiment of the present disclosure.
Figure 3B:
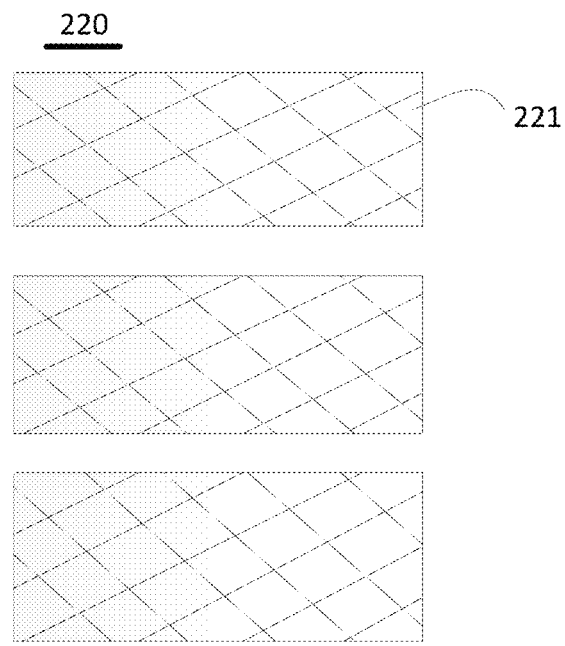
FIG. 3b is a schematic view for illustrating a sense electrode in an embodiment of the present disclosure.
Figure 3C:
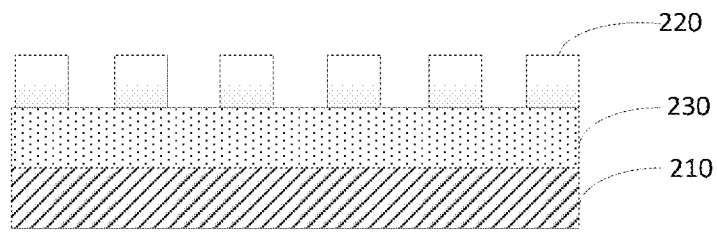
FIG. 3c is a structural view for illustrating a touch module in an embodiment of the present disclosure.

In embodiments of the present disclosure, there is no specific limitation to the structure of the touch module, and this can be selected by the person with ordinary skill in the art as needed. For example, the touch module comprises touch electrodes, insulating layers between the touch electrode or the like. In some embodiments of the present disclosure, there is no specific limitation to the structure and the shape of the touch electrode. For example, as shown in FIG. 3a, FIG. 3b and FIG. 3c, the touch electrode comprises a drive electrode 210 and a sense electrode 220 which are stacked with each other, and an insulating layer 230 which is arranged between the drive electrode 210 and the sense electrode 220. The drive electrode 210 is made from a first metal mesh, and the sense electrode 220 is made from a second metal mesh. The first metal mesh and the second metal mesh can be constructed into a plurality stripe shaped electrodes 211 and 221. For example, FIG. 3a schematically shows three stripe shaped electrodes 211 in the drive electrode 210 which are made from the first metal mesh, and FIG. 3b schematically shows three stripe shaped electrodes 221 in the sense electrode 220 which are made from the second metal mesh. There is no specific limitation to the arrangement of the drive electrode 210 and the sense electrode 220. For example, the plurality of stripe shaped electrodes can intersect with one another, e.g., so as to be perpendicular to one another (as shown in FIG. 3c).

Figure 7:
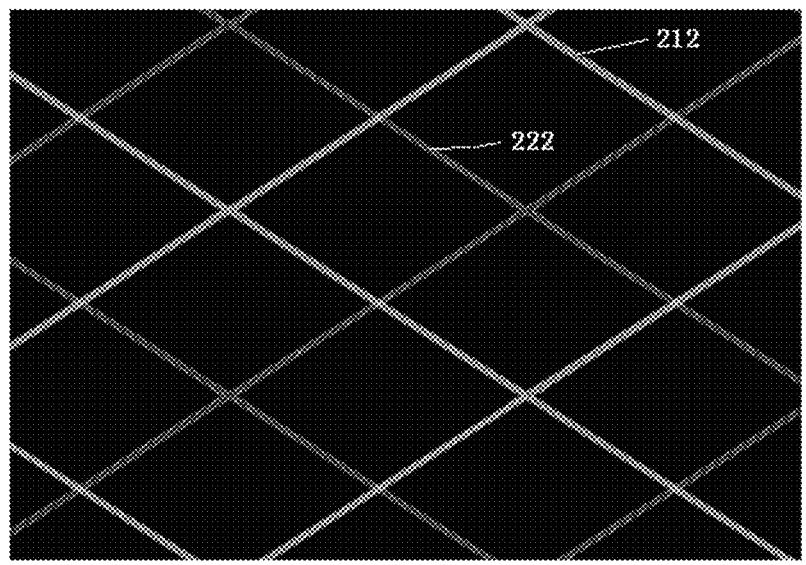
FIG. 7 is a structural view for illustrating a first metal mesh and a second metal mesh which are stacked with each other in an embodiment of the present disclosure.

In embodiments of the present disclosure, in order to further alleviate moire pattern, as shown in FIG. 7, the first metal mesh comprises at least one the first rhombus 212, and the second metal mesh comprises at least one the second rhombus 222. In an exemplary embodiment, the first rhombus 212 and the second rhombus 222 have a same shape and size, and an orthographic projection of vertexes of the first rhombus 212 on the second metal mesh overlaps a center of symmetry of the second rhombus 222. Thereby, this can further alleviate the moire pattern problem in the touch display device. As a result, the display uniformity is improved, the display image will not show significant difference at different positions due to the different moire pattern effect, and the moire phenomenon is reduced. This effectively improves optical properties of the touch display device, and improves the operational performance of the display device.

In embodiments of the present disclosure, the touch display device further comprises a display module. The display module comprises an array substrate, a color filter substrate and a polarizer. The display module and the touch module are stacked with each other. In embodiments of the present disclosure, the resulting moire pattern formed by the metal mesh touch electrode in the touch module is closely related with the pixel density of the display module, and they match with each other. The display module has a pixel density of 250-300 pixels per inch. For example, the pixel density comprises, but not limited to, 260 pixels per inch, 270 pixels per inch, 280 pixels per inch, 288 pixels per inch, 290 pixels per inch or the like. In case the display module has a pixel density in the above range, the severity degree of moire pattern can be significantly reduced, the phenomenon of moire pattern can be effectively improved, and the display quality and optical properties of the touch display device can be improved. In case the pixel density is too high or too low, the moire pattern becomes serious under the same conditions.

In embodiments of the present disclosure, there is no specific limitation to the type and structure of the above display module. This can be selected flexibly as needed by the person with ordinary skill in the art. For example, the display module can be a liquid crystal display module, or an OLED display module. The structure of the display module can be a structure of the conventional liquid crystal display module or the conventional OLED display module, which is not repeated here for simplicity.

In embodiments of the present disclosure, there is no specific limitation to the position where the touch module and the display module are arranged. This can be decided flexibly as needed by the person with ordinary skill in the art, e.g., according to the arrangement of any existing touch display device. For example, the arrangement comprises, but not limited to, an On cell touch display device, an In cell touch display device, an OGS touch display device or the like. In some embodiments of the present disclosure, the touch module can be arranged between the color filter substrate and the polarizer of the display module, or between the array substrate and the color filter substrate of the display module, or on the cover plate of the touch display device. Thereby, the structure is simple and easy to realize, can be applied in a wide range, and can well meet the market demand. The display device comprising the above touch module is improved in term of optical properties, the phenomenon of moire pattern is reduced, and the uniformity of the displayed image is improved.

Hereafter, the structure of the touch display device and the method for fabricating the same in the present disclosure will be described by taking the OGS touch display device, the On cell touch display device and the In cell touch display device as examples. Of course, it will be understood by the person with ordinary skill in the art that the description below elucidates the structure of the touch display device of the present disclosure, and can not be construed as limitation of the present disclosure.

Figure 4A:
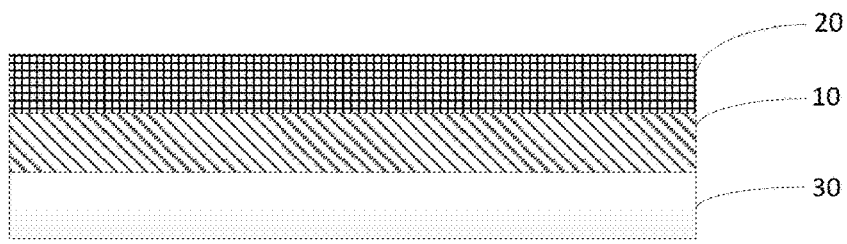
FIG. 4a is a structural view for illustrating an OGS touch display device in an embodiment of the present disclosure.
Figure 4B:
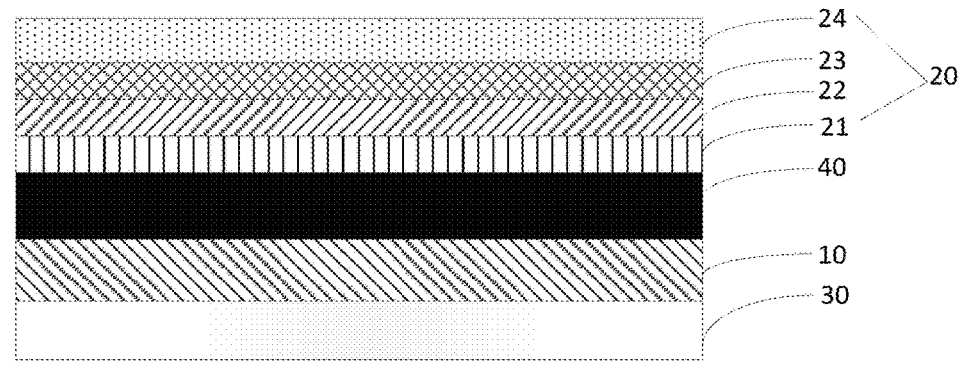
FIG. 4b is a structural view for illustrating an OGS touch display device in an embodiment of the present disclosure.

In embodiments of the present disclosure, as shown in FIG. 4a, the OGS touch display device comprises a display module 30, a cover plate 10 which is arranged at a side of the display module 30, and a touch module 20 which is arranged at a side of the cover plate 10 away from the display module 30. In particular, as shown in FIG. 4b, a black matrix layer 40 is further arranged between the cover plate 10 and the touch module 20. The touch module 20 comprises a first metal mesh 21, a first insulating layer 22 which is arranged at a side of the first metal mesh 21 away from the cover plate 10, a second metal mesh 23 which is arranged at a side of the first insulating layer 22 away from the cover plate 10, and a second insulating layer 24 which is arranged at a side of the second metal mesh 23 away from the cover plate 10. The first metal mesh 21 and the second metal mesh 23 form touch electrodes. For example, the first metal mesh 21 can be a drive electrode, and the second metal mesh 23 can be a sense electrode.

In embodiments of the present disclosure, there is no specific limitation to the method for fabricating the above-described OGS touch display device, which can be selected flexibly as needed by the person with ordinary skill in the art. In some embodiments of the present disclosure, the method comprises; (1) forming the black matrix layer 40 on the cover plate 10, comprising coating photoresist, exposure, and development, to form a desired pattern of the black matrix layer 40; (2) forming the first metal mesh 21, comprising evaporating a metal film, coating photoresist, exposure, development, and etching; (3) forming the first insulating layer 22, comprising coating photoresist, exposure, and development; (4) forming the second metal mesh 23, comprising evaporating a metal film, coating photoresist, exposure, development, and etching; (5) forming the second insulating layer 24, comprising coating photoresist, exposure, and development. Thereby, the fabricating steps are simple, the structure is easy to realize, the cost is low, and the resulting touch display device has excellent optical properties. This further alleviates the moire pattern effect. The structure is simple and easy to realize, can be applied in a wide range, and can well meet the market demand.

Figure 5:
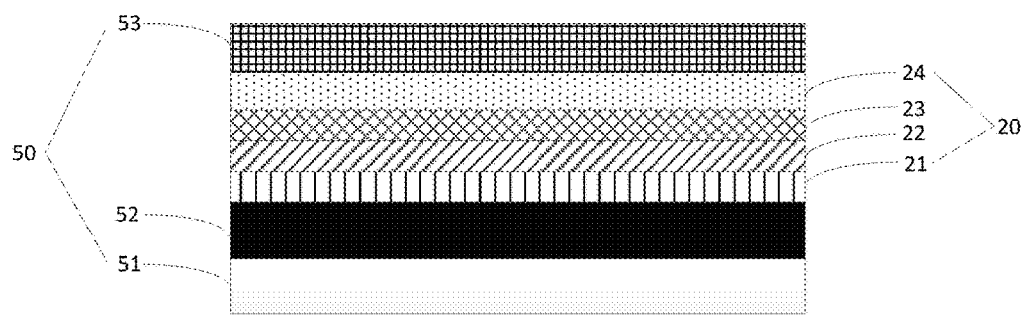
FIG. 5 is a structural view for illustrating an On cell touch display device in an embodiment of the present disclosure.

In embodiments of the present disclosure, as shown in FIG. 5, the On cell touch display device comprises a display module 50 and a touch module 20. The display module 50 comprises an array substrate 51, a color filter substrate 52 and a polarizer 53. The color filter substrate 52 is arranged between the polarizer 53 and the array substrate 51, the touch module 20 is arranged between the color filter substrate 52 and the polarizer 53, and the touch module 20 comprises a first metal mesh 21 which is arranged at a side of the color filter substrate 52 away from the array substrate 51, a first insulating layer 22 which is arranged at a side of the first metal mesh 21 away from the color filter substrate 52, a second metal mesh 23 which is arranged at a side of the first insulating layer 22 away from the color filter substrate 52, and a second insulating layer 24 which is arranged at a side of the second metal mesh 23 away from the color filter substrate 52. The first metal mesh 21 and the second metal mesh 23 form touch electrodes. For example, the first metal mesh 21 can be a drive electrode, and the second metal mesh 23 can be a sense electrode.

In embodiments of the present disclosure, there is no specific limitation to the method for fabricating the above-described On cell touch display device, which can be selected flexibly as needed by the person with ordinary skill in the art. In some embodiments of the present disclosure, the method for fabricating the On cell touch display device comprises: (1) forming the first metal mesh 21 on a surface of the color filter substrate 52 away from the array substrate 51, comprising evaporating a metal film, coating photoresist, exposure, development, and etching, to form the desired first metal mesh 21; (2) forming the first insulating layer 22, comprising coating photoresist, exposure, and development; (3) forming the second metal mesh 23, comprising evaporating a metal film, coating photoresist, exposure, development, and etching; (4) forming the second insulating layer 24, comprising coating photoresist, exposure, and development. Thereby, the fabricating steps are simple, the structure is easy to realize, the cost is low, and the resulting touch display device has excellent optical properties. This further alleviates the moire pattern effect. The structure is simple and easy to realize, can be applied in a wide range, and can well meet the market demand.

Figure 6:
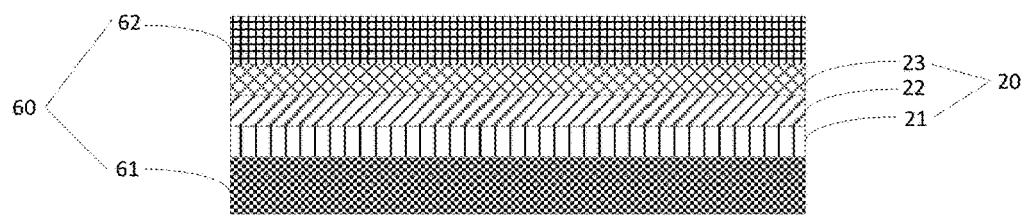
FIG. 6 is a structural view for illustrating an In cell touch display device in an embodiment of the present disclosure.

In embodiments of the present disclosure, as shown in FIG. 6, the In cell touch display device comprises a display module 60 and a touch module 20. The display module 60 comprises an array substrate 61 and a color filter substrate 62. The touch module 20 is arranged between the array substrate 61 and the color filter substrate 62. The touch module 20 comprises the first metal mesh 21 which is arranged at a side of the array substrate 61 close to the color filter substrate 62, an insulating layer 22 which is arranged at a side of the first metal mesh 21 away from the array substrate 61, the second metal mesh 23 which is arranged at a side of the insulating layer 22 away from the array substrate 61. The first metal mesh 21 and the second metal mesh 23 form touch electrodes. For example, the first metal mesh 21 can be a drive electrode, and the second metal mesh 23 can be a sense electrode.

In embodiments of the present disclosure, there is no specific limitation to the method for fabricating the above-described In cell touch display device, which can be selected flexibly as needed by the person with ordinary skill in the art. In some embodiments of the present disclosure, the method for fabricating the In cell touch display device comprises: (1) forming the first metal mesh 21 on a surface of the array substrate 61 close to the color filter substrate 62, comprising evaporating a metal film, coating photoresist, exposure, development, and etching, to form the desired first metal mesh 21; (2) forming the insulating layer 22, comprising coating photoresist, exposure, and development; (3) forming the second metal mesh 23, comprising evaporating a metal film, coating photoresist, exposure, development, and etching. Thereby, the fabricating steps are simple, the structure is easy to realize, the cost is low, and the resulting touch display device has excellent optical properties. This further alleviates the moire pattern effect. The structure is simple and easy to realize, can be applied in a wide range, and can well meet the market demand.

The moire pattern effect of the touch display device has been detected under different conditions by means of computer simulation. As for the metal mesh for forming touch electrodes in the touch display device (a structural view of the metal mesh is shown in FIG. 2), the first metal lines 10 and the second metal lines 20 intersect to form a plurality of rhombuses, and both the width A1 of the first metal lines and the width A2 of the second metal lines are 4±1 μm, the pixel density is 288 pixels per inch. The acute angle B of the rhombus, the height C of the rhombus, and the detection results are shown in Tables 1 and 2.

TABLE 1 a list of moire pattern grade in case B is within a range of 66~70 degrees

| B (degrees) | 66 | 66 | 67 | 67 | 67 | 68 | 68 | 69 | 69 | 70 | 70 | 70 |
|---|---|---|---|---|---|---|---|---|---|---|---|---|
| C (μm) | 170 | 210 | 160 | 170 | 210 | 160 | 170 | 160 | 170 | 160 | 170 | 200 |
| Moire pattern grade | 2 | 2 | 2 | 2 | 2 | 1.5 | 1.5 | 1.5 | 2 | 2 | 2 | 2 |

In embodiments of the present disclosure, all of the above-described touch display devices have a moire pattern grade not higher than 2. Thereby, the phenomenon of moire pattern in the touch display device is weak or absent, so that the touch display device has excellent optical properties, high display quality, and improved operational properties.

In another aspect of the present disclosure, the present disclosure provides a method for improving moire pattern in a touch display device. In embodiments of the present disclosure, the method comprises: forming touch electrodes of the touch display device by using the above-described metal mesh. Thereby, the fabricating method is simple, and the structure is easy to realize. Since the metal mesh is used as the touch electrode, the cost is low. This method can effectively alleviate the moire pattern effect and improve optical properties of the touch display device.

In embodiments of the present disclosure, the method for fabricating the touch display device further comprises a display module, and the method further comprises: arranging the display module with a pixel density of 250-300 pixels per inch. For example, the pixel density comprises, but not limited to, 260 pixels per inch, 270 pixels per inch, 280 pixels per inch, 288 pixels per inch, 290 pixels per inch or the like. In case the display module has a pixel density in the above range, the severity degree of moire pattern can be significantly reduced, and the optical properties of the touch display device can be improved. In case the pixel density is too high or too low, the moire pattern becomes serious under the same conditions In a common touch display device, the moire pattern is serious if the metal mesh is used as a touch electrode, while the cost is high if ITO is used as a touch electrode, so that the market demand can not be met. In the present disclosure, parameters of the metal mesh and the pixel density of the display module are modified, so that the modified touch display device has a low cost, and can effectively alleviate the moire pattern. As a result, this significantly reduces the severity degree of moire pattern, improves the optical properties of the touch display device, and improves the operational properties. The touch display device in embodiments of the present disclosure can be combined with an active pen, so as to efficiently meet the current market demand.

Detection results in embodiments of the present disclosure will be described in detail hereafter.

TABLE 2 a list of moire pattern grade in case B is not in the range of 66~70 degrees

| B (degrees) Moire pattern grade C(μm) | 71 | 72 | 73 | 74 | 75 | 76 | 80 |
|---|---|---|---|---|---|---|---|
| 150 | 3 | 3 | 2.5 | 3 | 3 | 3 | 3 |
| 160 | 2.5 | 2.5 | 3 | 3 | 3 | 3 | 3 |
| 170 | 2.5 | 3 | 3 | 3 | 2.5 | 2.5 | 4 |
| 180 | 4 | 3.5 | 3 | 3 | 3.5 | 3.5 | 4 |
| 190 | 4 | 3.5 | 2.5 | 2.5 | 3 | 4 | 5 |
| 200 | 2.5 | 3 | 3.5 | 3.5 | 3.5 | 4 | 5 |
| 210 | 4 | 4.5 | 4.5 | 4 | 4 | 4 | 4 |

The criteria for judging the moire pattern grade comprise: when the moire pattern grade is 0~1, there is no moire pattern at all; when the moire pattern grade is 1~2, there is a weak moire pattern; when the moire pattern grade is 2~3, there is a visible moire pattern; when the moire pattern grade is 3~4, there is a clear moire pattern; when the moire pattern grade is 4~5, there is an unacceptable moire pattern. In the above ranges for moire pattern grade, each range comprises the larger end value, while does not comprise the smaller end value. As can be seen from the above-described detection results, the metal mesh according to embodiments of the present disclosure can significantly alleviate the moire pattern problem of the touch display device, so that the touch display device has excellent display quality and optical properties.

In addition, the wordings such as "first", "second" or similar used in the description and claims of the present disclosure shall not represent any order, number or importance, but are used for distinguishing different elements. Thus, the feature defined by the wordings "first", "second" can explicitly or implicitly comprise one or more of such feature. In the present disclosure, "a plurality of" indicates two or more, unless the context clearly indicates otherwise.

In the description of the present disclosure, reference to the wordings "one embodiment", "some embodiments", "example", "specific examples", or "some examples" indicates that the specific feature, structure, material or characteristics which is described with reference to the embodiment or example is comprised in at least one embodiment or example of the present disclosure. In the present disclosure, the above-described wordings are not necessarily directed to a same embodiment or example. The described feature, structure, material or characteristics can be combined in a suitable manner in any one or more embodiment or example. In addition, in case of no mutual contradiction, the person with ordinary skill in the art can combine different embodiments or examples in the description and can combine features in different embodiments or examples.

Apparently, the person with ordinary skill in the art can make various modifications and variations to the present disclosure without departing from the spirit and the scope of the present disclosure. In this way, provided that these modifications and variations of the present disclosure belong to the scopes of the claims of the present disclosure and the equivalent technologies thereof, the present disclosure also intends to encompass these modifications and variations.

What is claimed is:

1. A metal mesh, comprising:
   at least two first metal lines which are in parallel with one another and separated from one another; and
   at least two second metal lines which are in parallel with and separated from one another, and intersect the at least two first metal lines,
   wherein the first metal lines and the second metal lines have a width of 1 µm-6 µm,
   wherein an intersection angle between the first metal lines and the second metal lines is 66 degrees-70 degrees,
   wherein a distance between two neighboring first metal lines and a distance between two neighboring second metal lines are 200 µm-210 µm,
   wherein the at least two first metal lines and the at least two second metal lines intersect to form at least one rhombus, and
   wherein the at least one rhombus has an acute angle between 66 degrees to 70 degrees, and the at least one rhombus has a height of 210 µm.

2. The metal mesh of claim 1, wherein the first metal lines and the second metal lines have a width of 1 µm-2 µm.

3. The metal mesh of claim 1, wherein the first metal lines have a same width as the second metal lines.

4. A touch display device, comprising a touch module, wherein the touch module comprises touch electrodes which comprise the metal mesh of claim 1.

5. The touch display device of claim 4,
   wherein ones of the touch electrodes of the touch module comprise a drive electrode and a sense electrode which are stacked and insulated from each other, and
   wherein the drive electrode and the sense electrode each have a stripe shape and intersect with each other.

6. The touch display device of claim 5,
   wherein the drive electrode comprises a first metal mesh,
   wherein the sense electrode comprises a second metal mesh,
   wherein the first metal mesh comprises at least one first rhombus, and
   wherein the second metal mesh comprises at least one second rhombus.

7. The touch display device of claim 6,
   wherein the first rhombus and the second rhombus have a same shape and a same size, and
   wherein an orthographic projection of vertexes of the first rhombus on the second metal mesh overlaps a center of symmetry of the second rhombus.

8. The touch display device of claim 4, further comprising:
   a display module,
   wherein the display module comprises an array substrate, a color filter substrate and a polarizer,
   wherein the display module and the touch module are stacked with each other, and
   wherein the display module has a pixel density of 250-300 pixels per inch.

9. The touch display device of claim 8, wherein the touch module is between the color filter substrate and the polarizer of the display module.

10. The touch display device of claim 8, wherein the touch module is between the array substrate and the color filter substrate of the display module.

11. The touch display device of claim 8, wherein the touch module is on a cover plate of the touch display device.

12. A method for improving moire pattern in a touch display device, comprising:
    forming a touch electrode of the touch display device from the metal mesh of claim 1.

13. The method of claim 12, wherein the touch display device further comprises a display module, and the method further comprises:
    arranging the display module with a pixel density of 250-300 pixels per inch.

* * * * *